United States Patent
Smithson

(10) Patent No.: US 9,201,156 B2
(45) Date of Patent: Dec. 1, 2015

(54) SYSTEM AND METHOD FOR MEASUREMENT INCORPORATING A CRYSTAL RESONATOR

(75) Inventor: Mitchell Carl Smithson, Pasadena, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 725 days.

(21) Appl. No.: 13/434,318

(22) Filed: Mar. 29, 2012

(65) Prior Publication Data

US 2013/0257628 A1  Oct. 3, 2013

(51) Int. Cl.
*G01V 3/00* (2006.01)
*G01V 3/30* (2006.01)

(52) U.S. Cl.
CPC ........................................ *G01V 3/30* (2013.01)

(58) Field of Classification Search
USPC .......... 340/853.1–870.44; 324/333, 337, 338, 324/639, 661; 374/136, 143, 184
See application file for complete search history.

(56) References Cited

U.S. PATENT DOCUMENTS

| | | | | |
|---|---|---|---|---|
| 2,607,220 A * | 8/1952 | Martin | ........................... | 374/143 |
| 3,320,579 A * | 5/1967 | Abbott | ........................... | 367/141 |
| 3,562,741 A * | 2/1971 | McEvoy et al. | .................. | 341/15 |
| 4,023,136 A * | 5/1977 | Lamensdorf et al. | ...... | 340/854.3 |
| 4,430,577 A * | 2/1984 | Bouquet | ........................ | 307/108 |
| 5,576,627 A * | 11/1996 | McEwan | ........................ | 324/639 |
| 5,942,991 A * | 8/1999 | Gaudreau et al. | ........ | 340/870.16 |
| 7,530,737 B2 * | 5/2009 | Thompson et al. | ........... | 374/136 |
| 7,636,052 B2 * | 12/2009 | Coates et al. | .............. | 340/854.6 |
| 7,810,993 B2 * | 10/2010 | Coates | ........................... | 374/184 |
| 8,077,053 B2 * | 12/2011 | Thompson et al. | ......... | 340/855.7 |
| 8,083,405 B2 * | 12/2011 | Coates | ........................... | 374/184 |
| 8,106,791 B2 * | 1/2012 | Thompson et al. | ......... | 340/854.3 |
| 8,143,906 B2 * | 3/2012 | Coates | ........................... | 324/661 |
| 8,353,677 B2 * | 1/2013 | Thompson et al. | .............. | 417/36 |
| 8,575,936 B2 * | 11/2013 | Bloys et al. | ..................... | 324/338 |
| 8,784,068 B2 * | 7/2014 | Thompson et al. | .............. | 417/36 |
| 2004/0178946 A1 * | 9/2004 | Kato et al. | ..................... | 342/100 |

(Continued)

FOREIGN PATENT DOCUMENTS

| | | |
|---|---|---|
| FR | 2320662 | 3/1977 |
| WO | WO 2007117846 A2 * | 10/2007 |
| WO | WO 2008/082302 | 7/2008 |
| WO | WO 2009/032899 | 3/2009 |
| WO | WO 2011066188 A1 * | 6/2011 |

OTHER PUBLICATIONS

International Search Report dated Jan. 30, 2014.

*Primary Examiner* — Paul Obiniyi
(74) *Attorney, Agent, or Firm* — Pillsbury Winthrop Shaw Pittman, LLP

(57) ABSTRACT

A system, method and device for interrogating a downhole environment in a borehole beneath a surface includes a source of electromagnetic energy, operable to transmit an electromagnetic signal in the borehole, a sensor module, including a passive resonating circuit including a crystal oscillator having a resonant frequency that varies with changes in the condition in the downhole environment to reflect the electromagnetic signal and to modulate the electromagnetic signal in response to a condition in the downhole environment in the borehole and a detector positionable to receive the reflected modulated electromagnetic signal. Embodiments include a power monitor and circuitry configured and arranged to measure an input frequency at a time when an inflection in the applied power is observed.

16 Claims, 4 Drawing Sheets

(56) References Cited

U.S. PATENT DOCUMENTS

2007/0235184 A1* 10/2007 Thompson et al. ...... 166/250.01
2008/0061789 A1* 3/2008 Coates et al. ................. 324/333
2009/0159361 A1* 6/2009 Coates et al. ................. 181/106
2009/0174409 A1* 7/2009 Coates et al. ................. 324/338
2011/0128003 A1* 6/2011 Thompson et al. ........... 324/337
2011/0267065 A1* 11/2011 Bloys et al. ................... 324/337
2012/0000658 A1* 1/2012 Coludrovich et al. ..... 166/305.1

* cited by examiner

SYSTEM AND METHOD FOR MEASUREMENT INCORPORATING A CRYSTAL RESONATOR

BACKGROUND

1. Field

The present invention relates generally to remote sensing and more particularly to sensing temperatures and/or pressures using a crystal resonator based sensor.

2. Background

In resource recovery, it may be useful to monitor various conditions at locations remote from an observer. In particular, it may be useful to provide for monitoring conditions at or near to the bottom of a borehole that has been drilled either for exploratory or production purposes. Because such boreholes may extend several miles, it is not always practical to provide wired communications systems for such monitoring.

U.S. Pat. No. 6,766,141 (Briles et al) discloses a system for remote downhole well telemetry. The telemetry communication is used for oil well monitoring and recording instruments located in a vicinity of a bottom of a gas or oil recovery pipe. Modulated reflectance is described for monitoring down-hole conditions.

As described in U.S. Pat. No. 6,766,141, a radio frequency (RF) generator/receiver base station communicates electrically with the pipe. The RF frequency is described as an electromagnetic radiation between 3 Hz and 30 GHz. A down-hole electronics module having a reflecting antenna receives a radiated carrier signal from the RF generator/receiver. An antenna on the electronics module can have a parabolic or other focusing shape. The radiated carrier signal is then reflected in a modulated manner, the modulation being responsive to measurements performed by the electronics module. The reflected, modulated signal is transmitted by the pipe to the surface of the well where it can be detected by the RF generator/receiver.

SUMMARY

An aspect of an embodiment of the present invention includes a source of electromagnetic energy, operable to transmit an electromagnetic signal in the borehole, a sensor module, including a passive resonating circuit including a crystal oscillator having a resonant frequency that varies with changes in the condition in the downhole environment to reflect the electromagnetic signal and to modulate the electromagnetic signal in response to a condition in the downhole environment in the borehole and a detector positionable to receive the reflected modulated electromagnetic signal.

An aspect of an embodiment includes a power monitor that detects a power level of the source of electromagnetic energy and circuit elements configured and arranged to determine inflections in the detected power level. In an embodiment, for each determined inflection, a resonance frequency is determined by determining a voltage input at a voltage controlled resonator of the source of electromagnetic energy.

DESCRIPTION OF THE DRAWINGS

Other features described herein will be more readily apparent to those skilled in the art when reading the following detailed description in connection with the accompanying drawings, wherein.

DETAILED DESCRIPTION

Figure 1:
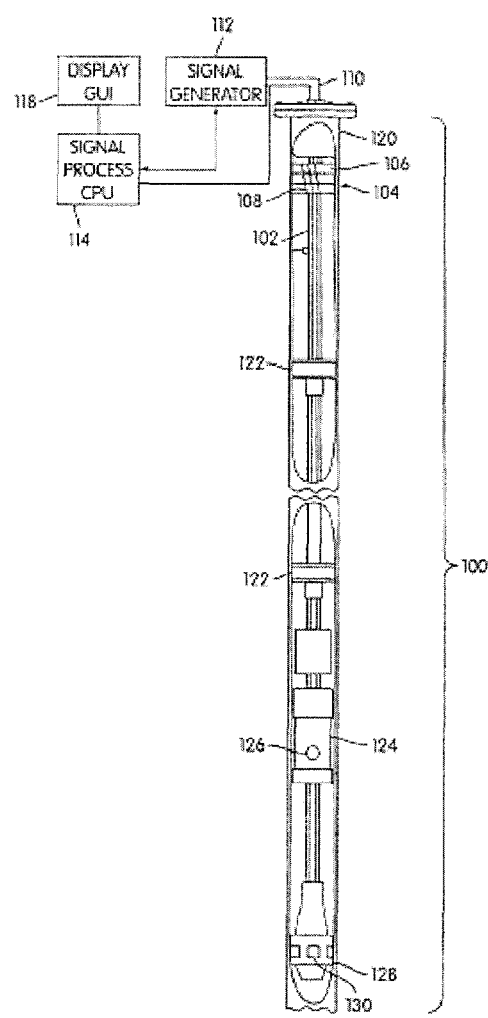
FIG. 1 is a schematic illustration of a system for interrogating a downhole environment in a borehole beneath a surface in accordance with an embodiment of the present invention.

FIG. 1 illustrates an example of an apparatus 100 for monitoring a condition in a subsurface borehole. The apparatus 100 includes an electromagnetically transmissive medium, such as a conductive line 102, for conducting electromagnetic energy through the borehole. It will be appreciated by those having ordinary skill in that art that the conductive line 102 may take different forms or embodiments, depending on the state of the borehole. Thus, for example, the conductive line 102 may comprise a production tubing string in a completed borehole or a drillstring in a borehole under construction. Near the top of the conductive line 102, a transformer 104 is provided to couple the conductive pipe to a source of electromagnetic energy. Alternate coupling methods to the transformer 104 may be employed. For example, the transmission line may directly couple to a coaxial cable or any other suitable cable.

In the example embodiment as shown, the transformer 104 includes a stack of ferrite rings 106, and a wire 108 wound around the rings. The wire 108 includes leads 110 that may be coupled to a signal generator 112 which may be configured to produce a pulsed or a continuous wave signal, as necessary or desirable. The wire 108 may further be coupled to a receiver 114. The receiver 114 may be embodied as a computer that includes a bus for receiving signals from the apparatus 100 for storage, processing and/or display. In this regard, the computer 114 may be provided with a display 118 which may include, for example, a graphical user interface.

The computer 114 may be programmed to process the modulated frequency to provide a measure of the sensed characteristic. The computer 114 may perform any desired processing of the detected signal including, but not limited to, a statistical analysis of the measurements.

In a typical drilling application, the borehole will be lined with a borehole casing 120 which is used to provide structural support to the borehole. This casing 120 is frequently made from a conductive material such as steel, in which case it will cooperate with the line 102 in order to form a coaxial transmission line, and it is not necessary to provide any additional conductive medium. Where the casing is not conductive, a conductive sleeve (not shown) may be provided within the casing in order to form the coaxial structure. In order to maintain a spacing between the line 102 and the casing 120, the apparatus 100 may include dielectric rings 122 disposed periodically along the conductive line 102.

The spacers can, for example, be configured as insulated centralizers which can be disks formed from any suitable material including, but not limited to, nylon or polytetrafluoroethylene (PTFE). Though the illustrated embodiment makes use of a coaxial transmission line, it is contemplated that alternate embodiments of a transmission line may be employed, such as a single conductive line, paired conductive lines, or a waveguide. For example, the casing alone may act as a waveguide for certain frequencies of electromagnetic waves. Furthermore, lengths of coaxial cable may be used in all or part of the line. Such coaxial cable may be particularly useful when dielectric fluid cannot be used within the casing 120 (e.g., when saline water or other conductive fluid is present in the casing 120).

A probe portion 124 is located near the distal end of the apparatus 100. In principle, the probe portion may be located at any point along the length of the transmission line. Indeed, multiple such probe portions may be placed at intervals along the length, though this would tend to create additional signal processing burdens in order to differentiate signals from the several probes. Setting a natural resonance frequency of each probe at a different frequency would, in principle, allow for a type of wavelength multiplexing on the coaxial line that could simplify the processing.

The probe portion includes a port 126 that is configured to communicate ambient pressures from fluid present in the borehole into the probe where it may be sensed by the sensor (not shown in FIG. 1). Below the probe is illustrated a packer 128 and packer teeth 130.

In use, the signal generator 112 generates a variable frequency sine wave commencing below and increasing through and beyond the resonant frequency of the sensor.

The probe includes a sensor that includes a resonant circuit portion that, upon receiving the excitation from the source, will optimally operate at the resonant frequency. The resonant circuit may be, for example, a tank circuit that includes inductive and capacitive components.

Figure 2:
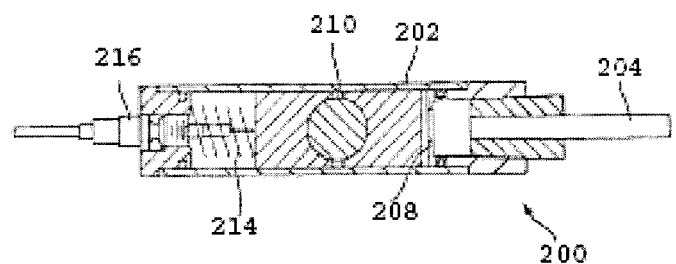
FIG. 2 is a schematic illustration of a sensor package incorporating a pressure or temperature sensor in accordance with an embodiment of the present invention.

In an embodiment, illustrated in FIG. 2, a crystal resonator 200 acts as the L-C tank circuit. The structure of the housing 202 has at one end a pressure feed-in tube 204 that allows pressure from the borehole environment that has entered via the port 126 to pass into an interior space 206 of the sensor 200. In the interior space, the pressure is transmitted to a flexible diaphragm 208 or otherwise pressure-reactive structure.

Motion of the diaphragm 208 is transmitted to a quartz crystal 210, or other piezoelectric crystal such as gallium phosphate. As pressure is transmitted to an edge of the quartz crystal, its resonant frequency changes. By correct selection of a direction of the face of the crystal, the sensor may be made to be more sensitive to pressure or to temperature (e.g., AC-cut). For pressure monitoring, the crystal should be preferentially sensitive to pressure and relatively less sensitive to temperature (e.g., AT-cut). Furthermore, for monitoring of pressure changes with a relatively high frequency response (e.g., monitoring of acoustic frequencies), it is useful for the crystal to be generally relatively thin (e.g., 0.2-2.0 mm) and a typical size is on the order of 1 cm in diameter.

A return spring mechanism 214 may be provided to bias the crystal 210 and its holders towards the feed-in tube 204 and thereby to tend to cause the diaphragm to return to a neutral position. An electrical feed through 216 is provided to couple the sensor 200 to the sensor circuit (not shown).

Figure 3A:
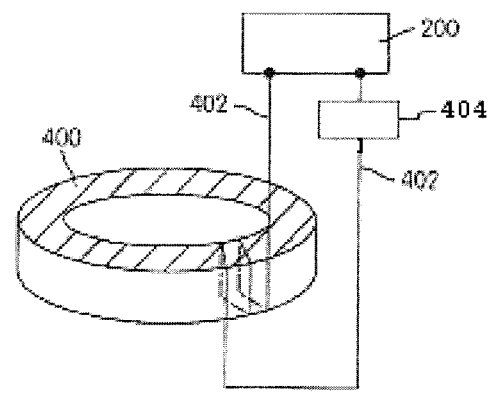
FIG. 3A is a schematic illustration of a circuit incorporating a crystal oscillator based sensor and a capacitive sensor in accordance with an embodiment of the present invention.
Figure 3:
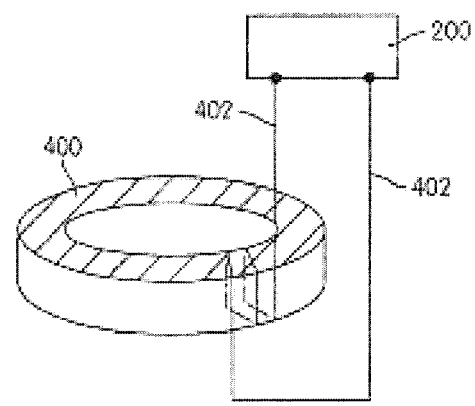
FIG. 3 is a schematic illustration of a circuit incorporating a crystal oscillator based sensor in accordance with an embodiment of the present invention.

The sensor 200 may be coupled to the transmission line via an inductive ferrite ring 400 as illustrated in FIG. 3. Electrical leads 402 are provided through the electrical feed through 216 of the sensor module. The leads 402 couple wire loops around the ferrite ring 400. In this embodiment, the oscillator has the characteristics of an L-C circuit and the ferrite ring essentially acts as a transformer to couple the oscillator to the transmission line.

FIG. 3A illustrates an alternate embodiment directed to a pressure sensor configuration. In this embodiment, the relatively temperature-insensitive crystal (e.g., AT cut crystal) is isolated from the ambient pressure, and a capacitive pressure-responsive element 404 is provided in series with the sensor 200' and exposed to the ambient pressure. In this configuration, the ferrite ring 400 again acts as a transformer, while the capacitive sensor 404 in combination with the crystal sensor 200' acts as the L-C tank circuit. The crystal sensor 200' will resonate with a frequency that depends in large part on the capacitance of the capacitive sensor 404. In this case, the capacitive sensor acts to pull the base frequency of the crystal oscillator as a function of the pressure sensed at the capacitor.

Figure 4:
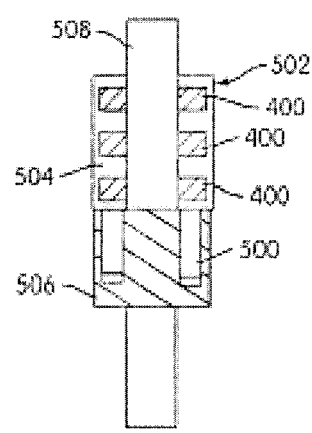
FIG. 4 is a schematic illustration of a package incorporating a plurality of sensors in accordance with one or more embodiments of the present invention.

FIG. 4 illustrates a package for sensors in accordance with embodiments of the present invention. A number of sensors 500 are disposed within a common housing 502. For each sensor 500, there is a corresponding ferrite ring 400, which is disposed in a portion 504 of the housing 502 that is made from a dielectric material, for example PTFE. While ordinarily there will be a one-to-one ratio of sensors to rings, it is also possible to have one ring correspond to two or even more sensors. As described above, the rings 400 couple the sensors to the transmission line 102. The sensors, in turn, are held in a metal block portion 506 of the sensor module. Tubing 508 is threaded into the metal block in order to positively locate the sensor package. In a typical application, this tubing may constitute either the production tubing itself, or an extension of the production string.

As will be appreciated, it is possible to combine pressure and temperature sensors in a single package, such that the temperature measurements may be used to help account for temperature related drift of the pressure sensor.

To account for variations in response that are well-dependent rather than temperature or pressure dependent, a calibration crystal sensor may be included along with the primary sensor. One approach is to make use of a temperature insensitive crystal that is isolated from the ambient pressure, similar to that used in the pressure sensor of FIG. 3A. In this variation, the crystal signal, isolated from pressure and relatively insensitive to temperature, will only react to the particular electromagnetic transmission characteristics of the well in which it is positioned. Therefore, its output can be regarded as being representative of the well shift only, unaffected by the other environmental factors.

Figure 5:
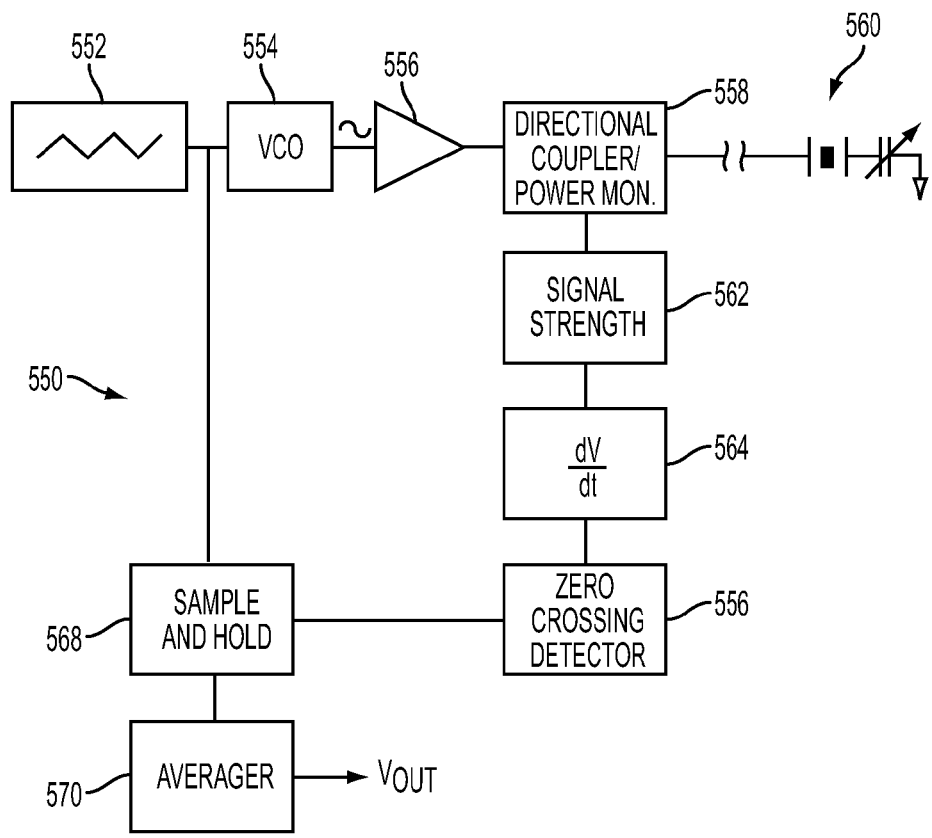
FIG. 5 is a schematic illustration of a detection circuit incorporating a power signal monitoring function in accordance with an embodiment of the present invention.

Referring now to FIG. 5, a particular embodiment of a detection circuit 550 for use with devices of the type described herein is schematically illustrated. In the illustrated embodiment, frequency of the input signal is frequency swept in a periodic manner, and the input power is monitored over time. When the frequency sweeps across the resonance frequency of the sensor, the power will show a notable change, and the corresponding frequency can be identified.

In the illustrated embodiment, a triangle wave generator 552 produces a voltage waveform that drives a voltage controlled oscillator (VCO) 554. In an embodiment, the triangle wave generator 552 is driven at a relatively low frequency, e.g., on the order of 100 Hz. In a particular embodiment, the triangle wave generator is driven at 200 Hz, or somewhere in the range of 100 Hz-300 Hz. The VCO is operable at relatively higher frequencies, for example on the order of a few MHz, and more particularly a range between about 1 MHz and about 3 MHz may be useful.

The output of the VCO passes through an amplifier 556 and passes to a directional coupler 558. In an embodiment as illustrated, the directional coupler 558 also includes a power monitor, though in principle, the two components may be separate. One output of the directional coupler passes to the downhole sensor arm 560 that includes the crystal oscillator and other components as described above. A second output directs a portion of the signal to a signal strength monitor 562, which is, in an embodiment, an AM detector. It should be recognized that this is only one of many ways to monitor power.

The signal detected at the signal strength monitor 562 is differentiated with respect to time using a differentiator 564 to identify peaks (zeroes) in the signal strength, that is, inflection points in the signal power. A zero crossing detector 566 is triggered at each zero output by the differentiator. In an alternate approach, the same function may be implemented using an analog to digital converter and the differentiation and zero detection can be performed using software modules, or combinations of hardware and software modules.

A sample and hold unit 568 monitors the output of the zero crossing detector 566, sampling the output of the triangle wave generator 552 at each zero crossing detected at the zero crossing detector 566. In this way, the sample and hold unit 568 collects voltage values from the input side of the VCO 554 that correspond to the resonance frequency of the crystal oscillator sensor.

As will be appreciated, there is a delay inherent in the system because travel time from the crystal oscillator sensor to the trigger for the sample and hold unit 568 is large for deep boreholes. Each kilometer of borehole corresponds to a bit more than three microseconds in the time domain. This delay can be accounted for by applying a correction to the measured voltages based on the known shape of the driving voltage's triangle wave. On the other hand, for each zero crossing occurring on a rising side of the triangle wave there will be a corresponding zero crossing occurring on the falling side. On the rising side, the delay results in a voltage reading that is skewed slightly high and on the falling side, the opposite occurs. Thus, an average of the two measured voltages should tend to cancel the effects of the delay.

Depending on the selected wave form for the input voltage, the unit will take a large number of samples per second. In an embodiment, the unit should encounter peak power detections hundreds of times per second. In an embodiment, the unit may be selectively driven to perform measurements in a 100 Hz-1 kHz range.

In view of this effect, in an embodiment the sample and hold unit 568 outputs to an averager 570 that produces a voltage signal out that will naturally tend to cancel the effects of the delay. Moreover, the averager 570 will tend to smooth spikes that may result from system noise or other transient effects. The time window for the moving average may be selected in accordance with a desired sensitivity. It may be useful to monitor changes in the observed values rather than the values themselves. For example, a large pressure transient may reflect a casing failure or a well kick. In this application, the averaging window should be relatively narrow, e.g., less than 1 s. On the other hand, temperature monitoring, or pressure monitoring during steady state drilling operations may not require sensitivity to short duration changes. In these applications, the averaging window can be relatively longer, e.g., several seconds. Alternately, median filters could be used, instead of or in addition to the averaging approach.

As an alternative to the sample and hold unit 568, a timing circuit may be used to measure the interval from the start of the triangle wave to the peak power detected. Since the triangle wave slope can be measured, the excitation voltage and VCO frequency can be computed. This method may be particularly useful since propagation delay of the signal in the wellbore is also measured in time.

While the receivers are generally described as being at the surface, it should be apparent that they may in principle be located at the surface of the earth, on a ship at sea, or at an intermediate depth in the earth or water, depending on the particular application.

Those skilled in the art will appreciate that the disclosed embodiments described herein are by way of example only, and that numerous variations will exist. Where the term "about" is applied to ranges, one of ordinary skill in the art will appreciate that, by way of example, a variation of ±0-10% may be implied. The invention is limited only by the claims, which encompass the embodiments described herein as well as variants apparent to those skilled in the art.

The invention claimed is:

1. A system for interrogating a downhole environment in a borehole beneath a surface, comprising:
    a source of electromagnetic energy, operable to transmit an electromagnetic signal in the borehole;
    a sensor module, comprising a passive resonating circuit, the passive resonating circuit comprising a crystal having a resonant frequency that varies with changes in the condition in the downhole environment such that the resonating circuit returns at least a portion of the electromagnetic signal in response to a condition in the downhole environment in the borehole;
    a detector configured and arranged to detect a power level of the source of electromagnetic energy; and
    a resonant frequency identifying circuit configured and arranged to identify the resonant frequency based on the detected power level.

2. A system as in claim 1, wherein the resonant frequency identifying circuit comprises a peak detector that is configured and arranged to determine a peak in the detected power level, and wherein the resonant frequency is identified on the basis of the peak.

3. A system as in claim 1, wherein the source of electromagnetic energy is configured and arranged to be driven such that a frequency of the transmitted electromagnetic signal is periodically swept.

4. A system as in claim 3, wherein the source of electromagnetic energy comprises a voltage controlled oscillator and a wave generator, in electrical communication with the voltage controlled oscillator, wherein the wave generator is configured and arranged to output a periodically varying voltage.

5. A system as in claim 4, wherein the wave generator is configured and arranged to output a triangle wave.

6. A system as in claim 4, wherein the resonant frequency identifying circuit comprises a peak detector that is configured and arranged to determine a peak in the detected power level, and wherein the resonant frequency is identified on the basis of the peak, further comprising:
    a sampling circuit that is configured and arranged to measure the periodically varying voltage for each time that a peak in the detected power level is detected.

7. A system as in claim 6, further comprising an averaging circuit, in electrical communication with the sampling circuit and configured and arranged to average measured values of the periodically varying voltage and wherein the resonant frequency is determined on the basis of the average measured values.

8. A system as in claim 6, wherein the peak detector comprises:
    a received signal strength monitor;
    a differentiator that differentiates the received signal strength with respect to time; and a zero crossing detector that detects zeros output by the differentiator corresponding to the peaks in the detected power level.

9. A system as in claim 4, wherein the resonant frequency identifying circuit comprises a peak detector that is configured and arranged to determine a peak in the detected power level, and wherein the resonant frequency is identified on the basis of the peak, further comprising a circuit that is configured and arranged to measure the time that the peak power level is detected with respect to the start of the varying input voltage.

10. A method for interrogating a downhole environment in a borehole beneath a surface, comprising:
   transmitting an electromagnetic signal in the borehole;
   returning at least a portion of the electromagnetic signal in response to a condition in the downhole environment in the borehole using a passive resonating circuit, the passive resonating circuit comprising a crystal having a resonant frequency that varies with changes in the condition in the downhole environment;
   detecting a power level of the source of electromagnetic energy; and
   identifying the resonant frequency based on the detected power level.

11. A method system as in claim 10, wherein the identifying comprises determining a peak in the detected power level, and identifying the resonant frequency on the basis of the peak.

12. A method as in claim 10, further comprising periodically sweeping a frequency of the electromagnetic signal.

13. A method as in claim 12, wherein the periodically sweeping comprises driving a source of the electromagnetic signal with a triangle wave.

14. A method as in claim 11, further comprising measuring a periodically varying voltage controlling the transmitting for each time that a peak in the detected power level is detected.

15. A method as in claim 14, further comprising averaging measured values of the periodically varying voltage and wherein the resonant frequency is determined on the basis of the average measured values.

16. A system as in claim 14, wherein the peak in the detected power level is detected by:
   monitoring a received signal strength;
   differentiating the received signal strength with respect to time; and
   detecting zeros output by the differentiator corresponding to peaks in the detected power level.

* * * * *